US005686374A

United States Patent [19]

Nakaoka

[11] Patent Number: 5,686,374
[45] Date of Patent: Nov. 11, 1997

[54] CATALYST FOR HYDROPROCESSING

[75] Inventor: Chikanori Nakaoka, Saitama, Japan

[73] Assignee: Japan Energy Corporation, Tokyo, Japan

[21] Appl. No.: 521,581

[22] Filed: Aug. 30, 1995

[30] Foreign Application Priority Data

Sep. 1, 1994 [JP] Japan .................. 6-230188

[51] Int. Cl.⁶ .................................................. B01J 29/10
[52] U.S. Cl. .................. 502/313; 502/307; 502/323; 502/329; 502/332; 502/66; 502/79; 502/342; 502/343
[58] Field of Search .................. 502/79, 66, 67, 502/73, 74, 307, 323, 313, 329, 332, 318, 327, 331, 342, 343

[56] References Cited

U.S. PATENT DOCUMENTS

| | | | |
|---|---|---|---|
| 4,500,645 | 2/1985 | Fuchikami et al. | 502/65 |
| 4,554,263 | 11/1985 | Fuchikami et al. | 502/66 |
| 4,585,748 | 4/1986 | Usui et al. | 502/66 |
| 4,738,940 | 4/1988 | Dufresne et al. | 502/66 |
| 4,789,654 | 12/1988 | Hirano et al. | 502/66 |

FOREIGN PATENT DOCUMENTS

| | | |
|---|---|---|
| 57-26713 | 6/1982 | Japan . |
| 58-20232 | 2/1983 | Japan . |
| 2-214544 | 8/1990 | Japan . |

*Primary Examiner*—Elizabeth D. Wood
*Assistant Examiner*—Bekir L. Yildirim
*Attorney, Agent, or Firm*—Sughrue,Mion,Zinn,Macpeak & Seas, PLLC

[57] ABSTRACT

A catalyst for hydroprocessing is described, which comprises a carrier having supported thereon a group VI metal and/or a group VIII metal of the periodic table, in which the carrier comprises an inorganic refractory substance selected from the group consisting of alumina alone and alumina containing at least one of silica, magnesia, and calcium oxide, Y type zeolite having a unit lattice constant of 2.425 to 2.445 nm, zinc oxide, and, if desired, a boron compound, which catalyst exhibits improved cracking and desulfurization activities and has a long life.

13 Claims, 2 Drawing Sheets

CATALYST FOR HYDROPROCESSING

FIELD OF THE INVENTION

This invention relates to a catalyst for hydroprocessing for carrying out desulfurization, denitrogenation, cracking, or the like treatment of mineral oil in the presence of hydrogen and provides a catalyst composition having excellent catalytic activity. More particularly, it relates to a catalyst suitable for hydroprocessing of heavy oil, which catalyst is required to have a cracking function and a desulfurization function.

BACKGROUND OF THE INVENTION

In order to cope with the recent tendency that crude oil is getting heavier and the environmental problem is getting more acute, the importance of hydroprocessing technique in which heavy oil is cracked and, at the same time, desulfurized and denitrogenated to obtain highly refined light oil has ever been increasing.

For increasing cracking efficiency of heavy oil, it has been proposed to use a catalyst which comprises a carrier comprising an inorganic refractory substance, such as alumina, having incorporated therein Y type zeolite (see JP-B-4-62780 (corresponding to U.S. Pat. No. 4,585,748) and JP-B-4-62781 (corresponding to U.S. Pat. No. 4,554,263), the term "JP-B" as used herein means an "examined published Japanese patent application") or a zinc compound (see JP-B-57-26713 and JP-A- 58-20232, the term "JP-A" as used herein means an "unexamined published Japanese patent application"), and an active metal catalyst component having supported on the carrier.

However, Y type zeolite has so high cracking activity that it tends to undergo deactivation of catalytic activity due to coking and therefore has an insufficient catalyst life for practical use. On the other hand, addition of a zinc compound does not always produce distinct effects.

Catalysts using a carrier comprising alumina-zinc oxide, alumina-boria or alumina-silica-magnesia having incorporated therein Y type zeolite have also been proposed (see JP-B-2-39305 (corresponding to U.S. Pat. No. 4,500,645)). These catalysts are still unsatisfactory in catalytic activity and life. Considering that the content of persistent sulfur compounds in crude oil that are hardly removed has been increasing with the tendency toward heaviness of crude oil, development of a catalyst having further improved activities has been awaited.

SUMMARY OF THE INVENTION

An object of the present invention is to provide a catalyst composition for hydroprocessing which possesses both high cracking activity and high desulfurization activity and has an extended life.

The inventor of the present invention has extensively studied for the purpose of suppressing catalyst deactivation due to coking which inevitably accompanies high rate cracking under practical conditions of hydroprocessing. As a result, he has found that a catalyst composition having satisfactory hydroprocessing activity and a long catalyst life can be obtained by using a carrier comprising an inorganic refractory substance, such as alumina, having incorporated therein specific Y type zeolite having a unit lattice constant of 2.425 to 2.445 nm which is obtained by steaming and acid treatment of Y type zeolite so as to reduce the aluminum content and change the pore structure, while the steaming and acid treatment are accompanied with partial crystal destruction. The present invention has been completed based on this finding.

The present invention provides a catalyst for hydroprocessing comprising a carrier having supported thereon a group VI metal and/or a group VIII metal of the periodic table, in which the carrier comprises an inorganic refractory substance selected from the group consisting of alumina alone and alumina containing at least one of silica, magnesia, and calcium oxide, Y type zeolite having a unit lattice constant of 2.425 to 2.445 nm, zinc oxide, and, if desired, a boron compound.

In a preferred embodiment of the present invention, the Y type zeolite contains at least one element selected from the group consisting of zinc, cobalt, nickel, iron, copper, titanium, niobium, molybdenum, and zirconium.

In another preferred embodiment of the present invention, the carrier contains 1 to 50% by weight (still preferably 5 to 30% by weight) of Y type zeolite, 0.1 to 10% by weight (still preferably 1 to 5% by weight), in terms of ZnO, of zinc oxide, and, if desired, 0.1 to 16% by weight (still preferably 5 to 12% by weight), in terms of $B_2O_3$, of a boron compound, each based on the total weight of the carrier, the balance (i.e., the remainder) being an inorganic refractory substance.

In still another preferred embodiment, the zinc oxide in the carrier has a particle size of from 0.1 to 100 μm.

In a further preferred embodiment, the boron compound, if added, is used in such an amount that a $B_2O_3/(B_2O_3+Al_2O_3)$ ratio in the carrier may range from 0.06 to 0.20, still preferably 0.08 to 0.16.

In a furthermore preferred embodiment, the inorganic refractory substance comprises 0 to 10% by weight (still preferably 1 to 5% by weight), in terms of $SiO_2$, of silica, 0 to 5% by weight (still preferably 0.1 to 1% by weight), in terms of MgO, of magnesia, and 0 to 5% by weight (still preferably 0.1 to 1% by weight), in terms of CaO, of calcium oxide, each based on the total weight of the inorganic refractory substance, the balance being alumina.

DETAILED DESCRIPTION OF THE INVENTION

Figure 1:
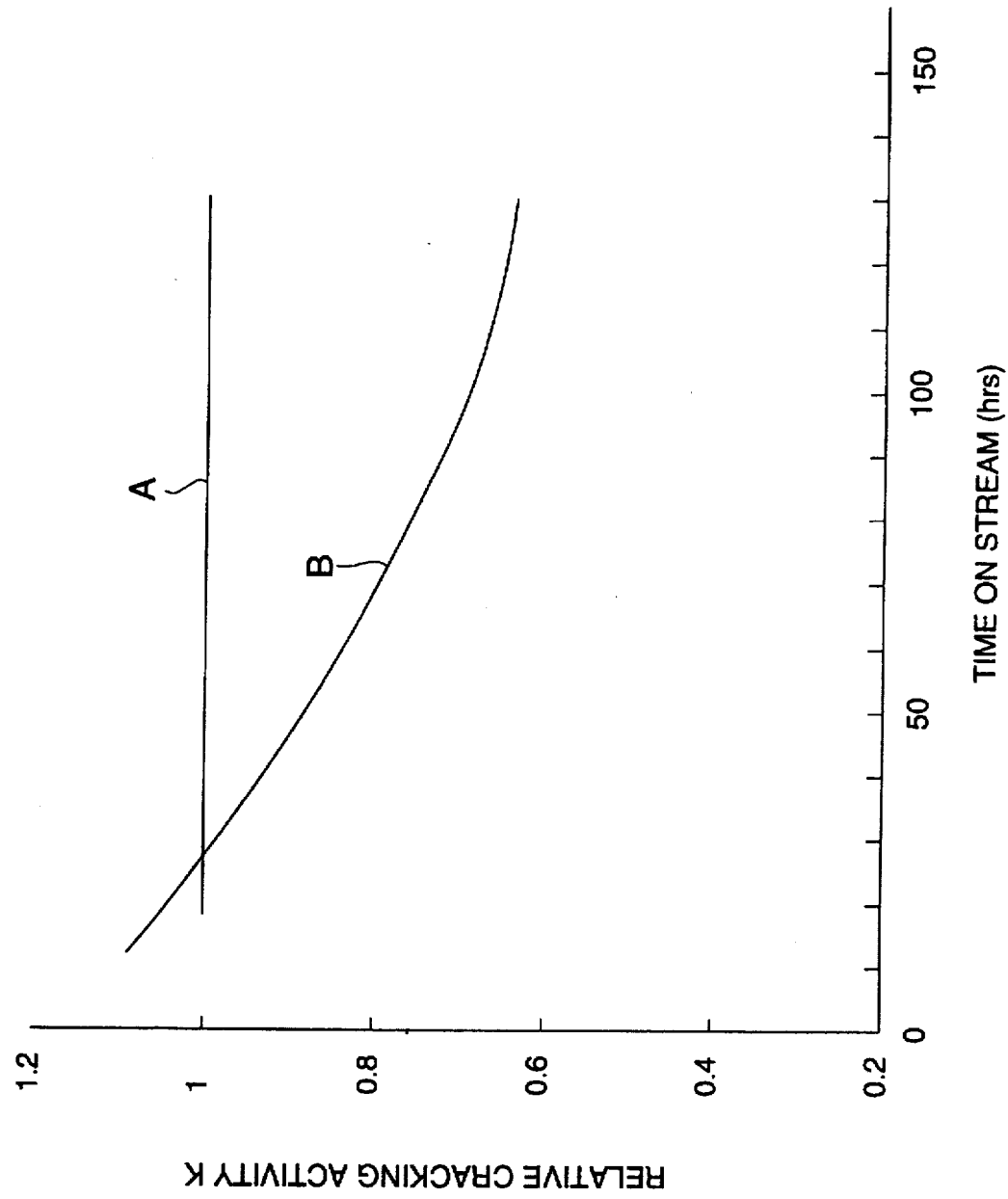
FIG. 1 is a graph showing the relative change, with time, of cracking activity of a comparative Example 1 catalyst B (curve B), taking the activity of the catalyst of Example 1 catalyst A as a standard (line A).

Y type zeolite as referred to in the present invention is synthetic zeolite having a faujasite structure and an Si/Al molar ratio of 3 to 6. Y type zeolite synthesized by any process can be used with no limitation. In the present invention, Y type zeolite is first subjected to dealkalization to reduce its alkali metal content to 0.5% by weight or less. This is to stabilize the crystal structure of Y type zeolite. Y type zeolite having an alkali metal content exceeding 1% by weight tends to undergo fatal destruction on its crystal structure through the subsequent treatments.

The dealkalization can be carried out, for example, as follows. Y type zeolite is treated with an aqueous solution containing an ammonium salt to exchange the alkali metal for an ammonium ion, followed by calcination. The ion exchange and subsequent calcination are repeated several times to prepare Y type zeolite with its alkali metal content reduced to 0.5% by weight or less (hereinafter referred to as HY zeolite). Part of the crystal structure of Y type zeolite is destroyed by the dealkalization treatment. Since the crystal structural destruction occurs predominantly during calcination, it is recommended to control the calcining temperature as low as possible, preferably in the range of from 400° to 500° C., in order to minimize the destruction.

The thus prepared HY zeolite is then brought into contact with steam at 600° to 900° C. and, in some cases, washed with an aqueous acid solution to reduce the aluminum content thereby to obtain Y type zeolite having excellent hydrothermal stability (hereinafter referred to as USY zeolite). The steaming and the subsequent acid treatment, if conducted, should be performed so that the unit lattice constant of the resulting USY zeolite may fall within the range of from 2.425 to 2.445 nm. If the unit lattice constant exceeds 2.445 nm, the rate of catalytic deactivation is too high for practical use. If it is smaller than 2.425 nm, the catalytic activity is insufficient for practical use.

The aluminum ion in USY zeolite can be exchanged for at least one metal ion selected from the group consisting of zinc, cobalt, nickel, iron, copper, titanium, niobium, molybdenum, and zirconium. The resulting USY zeolite containing these metals exhibits further improved cracking activity and a further prolonged catalyst life. In this embodiment, the above-mentioned metals are preferably incorporated in a total amount of 0.1 to 5% by weight based on the weight of the zeolite.

The USY zeolite is preferably used in an amount of 1 to 50 parts by weight, still preferably 5 to 30 parts by weight, per 100 parts by weight of a total carrier.

A catalyst using a carrier simply containing the above-mentioned USY zeolite alone does not always exhibit insufficient catalytic activity in cracking and also shows no significant improvement in desulfurization activity. In order to find out the cause of the insufficient activity, the inventor has conducted detailed analyses on feedstock oil and product oil obtained by using the above catalyst. It has been revealed as a result that the heavy components in the product oil are very close to an average structure of the feedstock oil, suggesting that because cracking of heavy components hardly proceeds, the overall rate of cracking would not increase. That is, the primary cracking of heavy components is expected to be a rate-determining step for the overall reaction. Hence, the inventor has studied on development of a further improved carrier which would balance primary cracking of heavy components with the following secondary cracking, with the expectation that an increased rate of cracking would be reached while inhibiting over-cracking and deactivation due to coking. As a result, it has now been found that incorporation of zinc oxide and, if desired, a boron compound into a carrier in addition to the above-described USY zeolite brings about significant improvement on cracking and desulfurization activity.

Zinc oxide may be incorporated into a carrier by impregnation with an aqueous solution of a zinc compound, such as zinc nitrate, followed by calcination to convert the zinc compound to zinc oxide. More remarkable improving effects can be obtained by using particulate zinc oxide having a particle size of from 0.1 to 100 μm, preferably 5 to 30 μm, and a specific surface area of from 0.01 to 1 m$^2$/g which is crystalline as seen from the X-ray diffraction pattern and incorporating such zinc oxide particles into a carrier by, for example, kneading. While the reason is unclear, a carrier prepared by dispersing zinc in a carrier matrix uniformly and finely by impregnation or a carrier prepared by dispersing a water-soluble zinc compound or a finely powdered zinc compound in a carrier matrix by kneading was found less effective in improving the activity than the one prepared by using particulate zinc oxide. As a result of analysis on the cross section of these carriers with an X-ray microanalyzer, the carriers prepared by impregnation or by using a water-soluble zinc compound or a finely powdered zinc compound were found having dispersed therein metallic zinc extremely uniformly, and no particles of 0.1 μm or greater was observed.

Zinc oxide is preferably incorporated in an amount of from 0.1 to 10 parts by weight, still preferably 1 to 5 parts by weight, in terms of ZnO, per 100 parts by weight of a total carrier.

A boron compound, if desired, can be incorporated into a carrier in a similar manner to zinc oxide, i.e., it is preferable to incorporate powder of boric acid, ammonium borate, etc. by, for example, kneading. A boron compound may also be incorporated by impregnation with a solution containing a boron compound.

The boron compound is preferably incorporated in an amount of from 0.1 to 16 parts by weight, still preferably 5 to 12 parts by weight, in terms of $B_2O_3$, per 100 parts by weight of a total carrier. When a boron compound is added, balance between boron and alumina is of importance, and it is preferable to select the amount of the boron compound to be added so that a $B_2O_3/(B_2O_3+Al_2O_3)$ ratio in the carrier may range from 0.06 to 0.20, still preferably 0.08 to 0.16. If the ratio is less than 0.06, the effect of addition of boron is insubstantial. If the ratio exceeds 0.20, the catalytic activity would be rather reduced. Boron is most effective when the above ratio is from 0.08 to 0.16.

Addition of a boron compound is arbitrary, but a carrier containing both zinc oxide and a boron compound is more effective.

The inorganic refractory substance which can be used in the present invention typically includes alumina. Addition of silica to alumina is effective to improve cracking activity. Addition of from 0 to 5% by weight, preferably 0.1 to 1% by weight, based on the total weight of the inorganic refractory substance, of magnesia or calcium oxide to alumina is effective to improve desulfurization activity. Note that addition of more than 5% by weight of magnesia or calcium oxide tends to hinder catalytic activity. Accordingly, a preferred inorganic refractory substances comprise 0 to 10 parts by weight (still preferably 1 to 5 parts by weight), in terms of $SiO_2$, of silica, 0 to 5 parts by weight (still preferably 0.1 to 1 part by weight), in terms of MgO, of magnesia, and 0 to 5 parts by weight (still preferably 0.1 to 1 part by weight), in terms of CaO, of calcium oxide, per 100 parts by weight of total inorganic refractory substances, the balance being alumina.

The carrier of the catalyst composition according to the present invention can be prepared, for example, as follows.

Prescribed amounts of a hydrogel of alumina, silica, magnesia, calcium oxide, USY zeolite, zinc oxide and, if desired, a boron compound are sufficiently kneaded, formed into a prescribed shape, dried at room temperature to 200° C., preferably 80° to 130° C., for 0.5 to 12 hours, and calcined at 350° to 800° C., preferably 450° to 600° C., for 0.5 to 2 hours to obtain a carrier.

On the thus obtained carrier is supported a group VI metal and/or a group VIII metal of the periodic table by, for example, impregnation with a solution of the compound of the metal to prepare a catalyst. Suitable compounds of the group VI metal to be used for impregnation include ammonium paramolybdate, molybdic acid, ammonium molybdate, phosphomolybdic acid, ammonium tungstate, tungstic acid, tungstic anhydride, and tungstophosphoric acid. For impregnation of the group VIII metal, an aqueous solution of a nitrate, a sulfate, a chloride, a fluoride, a bromide, an acetate, a carbonate or a phosphate of nickel or cobalt is used. The group VI metal(s) and the group VIII metal(s) are supported on the carrier in a total amount of from 5 to 25% by weight and 0.5 to 10% by weight, respectively, in terms of the respective oxide, based on the total weight of a catalyst.

Hydroprocessing of feedstock oil in the presence of the resulting catalyst is preferably carried out under conditions of a temperature of from 250° to 450° C., a hydrogen partial pressure of from 20 to 250 kg/cm$^2$, a liquid hourly space velocity of from 0.1 to 5 hr$^{-1}$ and a hydrogen/oil ratio of from 100 to 2000 Nl/l. In general, it is recommended to subject the catalyst to previous sulfiding with a hydrocarbon containing a sulfur compound such as hydrogen sulfide and carbon disulfide, prior to use in hydroprocessing of feedstock.

The catalyst for hydroprocessing according to the present invention is applicable to hydroprocessing of mineral oil fractions, for example, a broad range of petroleum cuts or residual oil. In particular, the catalyst remarkably displays its improved activity when applied to hydroprocessing of heavy oil, such as crude oil, cuts obtained from crude oil, such as vacuum distillation oil, topping residual oil, and vacuum distillation residual oil, and deasphalted oil obtained by solvent deasphalting of crude oil or residual oil, or mixed oil thereof.

The present invention will now be illustrated in greater detail with reference to Examples, but it should be understood that the present invention is not deemed to be limited thereto. Unless otherwise indicated, the percents and parts are by weight.

EXAMPLE 1

(a) Commercially available sodium Y type zeolite (200 g) (SiO$_2$/Al$_2$O$_3$ molar ratio: 2.9; Na$_2$O content: 12.3%; a unit lattice constant: 2.463 nm; surface area: ca. 800 m$^2$/g) was subjected to ion exchange at 50° C. using 2000 ml of 1M aqueous solution of ammonium nitrate, followed by filtration. After washing with water and drying at 130° C. for 3 hours, the zeolite was calcined at 450° C. for 3 hours. The ion exchange and calcination were conducted 9 times to obtain HY zeolite having an Na$_2$O content of 0.5% based on the weight of HY zeolite, an SiO$_2$/Al$_2$O$_3$ molar ratio of 5.8, and a unit lattice constant of 2.455 nm.

(b) HY zeolite (150 g) was calcined in a rotary kiln at 700° C. under a steam pressure of 300 mm Hg for 3 hours and then dipped in 2000 ml of a nitric acid aqueous solution adjusted to pH of about 1.5 at 50° C., followed by filtration and washing with water. After drying at 130° C. for 3 hours, the zeolite was calcined at 450° C. for 3 hours to obtain USY zeolite. The resulting USY zeolite was found to have a unit lattice constant of 2.438 nm and a surface area of about 600 m$^2$/g.

Figure 2:
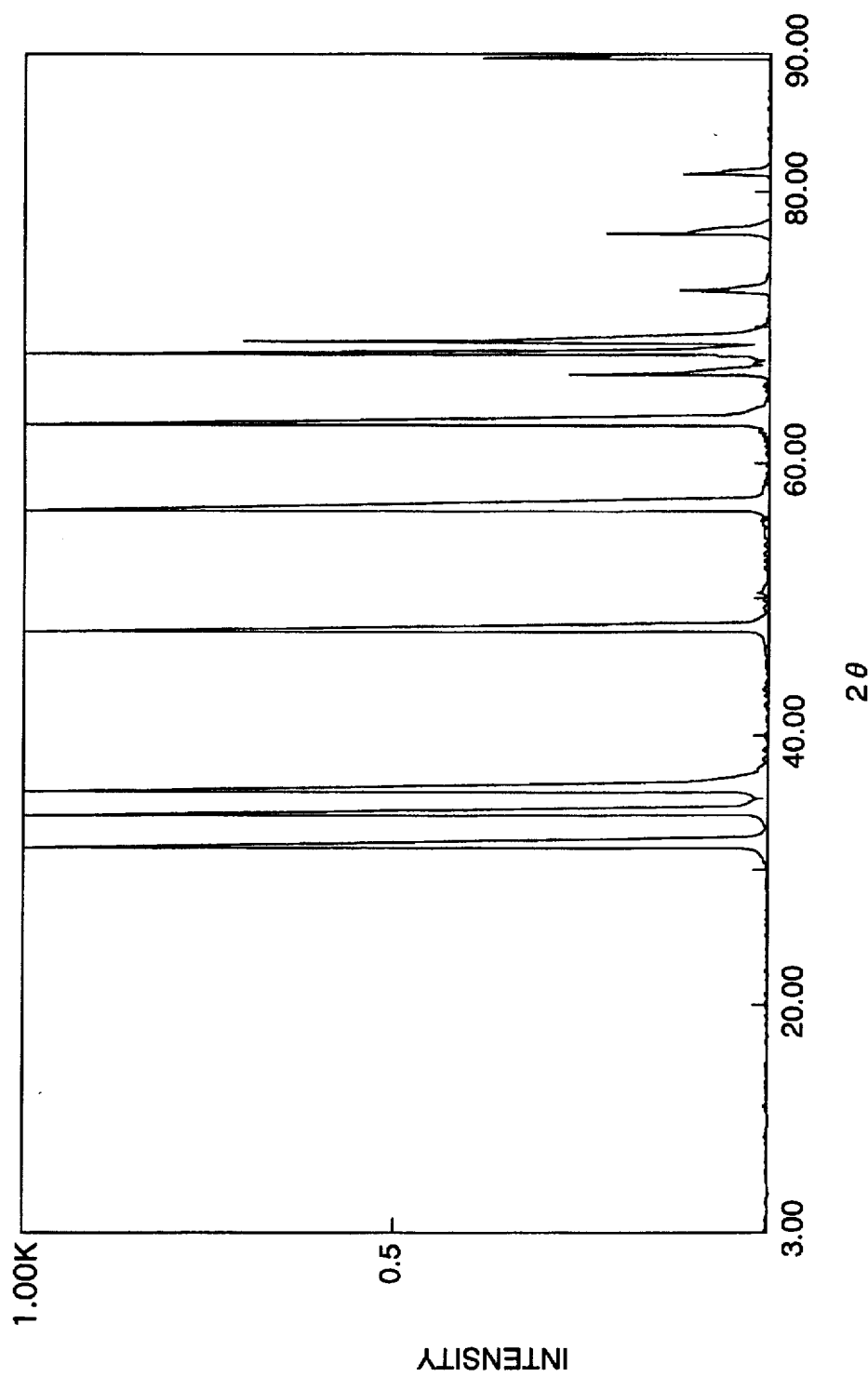
FIG. 2 is an X-ray diffraction pattern of particulate zinc oxide used in Example 1.

(c) USY zeolite, particulate zinc oxide having an average particle size of 11 μm (the X-ray diffraction pattern of the zinc oxide is shown in FIG. 2, in which a typical diffraction pattern of ZnO crystal is displayed; specific surface area: 0.2 m$^2$/g), and boric acid powder were mixed and kneaded with alumina gel, extruded into a cylinder of 1.6 mm in diameter, dried at 130° C. for 3 hours, and calcined at 600° C. for 2 hours to obtain carrier A.

Carrier A contained 58.2% of alumina, 30% of USY zeolite, 5% of ZnO, 6.8% of B$_2$O$_3$, each based on the total weight of carrier A. The weight ratio of boron to aluminum in carrier A, B$_2$O$_3$/(B$_2$O$_3$+Al$_2$O$_3$) was 0.10. Cross section analysis of carrier A with an X-ray microanalyzer revealed a great number of zinc oxide particles of 0.1 μm or greater.

(d) Carrier A was impregnated with an aqueous solution of ammonium molybdate. After drying at 130° C. overnight, the carrier was further impregnated with a nickel nitrate aqueous solution, dried at 130° C. for 3 hours, and calcined at 500° C. for 0.5 hour to obtain catalyst A. Catalyst A had supported thereon molybdenum and nickel in an amount of 8% and 3%, respectively, in terms of the respective metal, based on the total weight of catalyst A.

(e) Vacuum distillation oil having the following properties was passed through a catalyst A layer under conditions of a hydrogen pressure of 40 kg/cm$^2$, a liquid hourly space velocity (LHSV) of 0.8 hr$^{-1}$, a hydrogen/feedstock oil ratio of 400 l/l, and a reaction temperature of 400° C.

Properties of Feedstock Oil:

Specific gravity: 0.9241

Sulfur content: 2.42 wt %

Nitrogen content: 910 wtppm

Cut having b.p. 360° C. or higher: 94.0%

After 85 hours processing, the hydrodesulfurization, denitrogenation, and cracking activity of catalyst A were evaluated. The results obtained are shown in Table 2.

In order to examine deactivation of cracking activity with time, the hydroprocessing was continued for 130 hours while keeping the above conditions.

As criteria of evaluation, a rate constant of desulfurization with respect to the sulfur concentration in the feedstock oil was used assuming 1.5 as the order of reaction; a rate constant of denitrogenation with respect to the nitrogen concentration in the feedstock oil was used assuming 1 as the order of reaction; and a rate of reduction of a cut having a boiling point of not lower than 360° C. in the feedstock oil (hereinafter referred to as a cracking rate) was used. These criteria are given through the following formulae:

Rate constant of desulfurization:

$$Ks = \left[ \frac{1}{\sqrt{Sp}} - \frac{1}{\sqrt{Sf}} \right] \times SV \times 2$$

Rate constant of denitrogenation:

$$K_N = SV \times ln(Nf/Np)$$

Cracking rate:

$$C\ (\%) = (Cf - Cp)/Cf \times 100$$

wherein Sf represents a sulfur concentration (mol/l) in the feedstock oil; Sp represents a sulfur concentration (mol/l) in the product oil; Nf represents a nitrogen concentration (wtppm/l) in the feedstock oil; Np represents a nitrogen concentration (wtppm/l) in the product oil; Cf represents the cut (%) having a boiling point of not lower than 360° C. in the feedstock oil; Cp represents the cut (%) having a boiling point of not lower than 360° C. in the product oil; and SV represents a liquid hourly space velocity (hr$^{-1}$) (the amount of feedstock oil (l) treated per hour per liter of catalyst).

COMPARATIVE EXAMPLE 1

(a) Modified Y type zeolite having a unit lattice constant of 2.450 nm was prepared in the same manner as in Example 1-(b), except that the calcination in a rotary kiln was conducted at a temperature of 550° C. (steam pressure of 300 mm Hg×3 hours). Carrier B was prepared in the same manner as in Example 1-(c), except for using the above prepared modified Y type zeolite. Carrier B contained 58.2% of alumina, 30% of zeolite, 5% of ZnO, and 6.8% of $B_2O_3$, each based on the total weight of carrier B.

(b) Catalyst B having supported thereon 8% of molybdenum and 3% of nickel, each based on the total weight of catalyst B, was prepared in the same manner as for catalyst A in Example 1, except for using carrier B.

The cracking activity of catalyst B was measured with time in hydroprocessing under the same reaction conditions as in Example 1 to examine the catalyst life. The results of measurement are plotted against reaction time in FIG. 1, as expressed relatively taking the cracking activity of catalyst A as a standard (100). As can be seen from FIG. 1, although catalyst B is more active than catalyst A in the initial stage of treatment, it undergoes serious deactivation and becomes less active than catalyst A in as short a time as about 50 hours.

The above comparison proves that a catalyst using zeolite having a unit lattice constant of higher than 2.445 nm suffers from considerable deactivation in catalytic activity.

COMPARATIVE EXAMPLE 2

(a) Modified Y type zeolite having a unit lattice constant of 2.423 nm was prepared in the same manner as in Example 1-(b), except that the calcination in a rotary kiln was conducted at a temperature of 900° C. (the steam pressure and the calcination time are the same). Carrier C was prepared in the same manner as in Example 1, except for using the above prepared modified Y type zeolite. Carrier C contained 58.2% of alumina, 30% of zeolite, 5% of ZnO, and 6.8% of $B_2O_3$, each based on the total weight of carrier C.

(b) Catalyst C having supported thereon 8% of molybdenum and 3% of nickel, each based on the total weight of catalyst C, was prepared in the same manner as for catalyst A in Example 1, except for using carrier C.

The catalytic activity of catalyst C was evaluated in the same manner as in Example 1. The results obtained are shown in Table 2. It is seen that catalyst C using zeolite whose unit lattice constant is less than 2.425 nm is inferior to catalyst A in both cracking activity and desulfurization activity.

COMPARATIVE EXAMPLE 3

(a) Thirty parts of the same USY zeolite having a unit lattice constant of 2.438 nm as prepared in Example 1-(b) were mixed and kneaded with 70 parts of alumina gel, extruded into a cylinder of 1.6 mm in diameter, dried at 130° C. for 3 hours, and calcined at 600° C. for 2 hours to obtain carrier D.

(b) Catalyst D having supported thereon 8% of molybdenum and 3% of nickel, each based on the total weight of catalyst D, was prepared in the same manner as for catalyst A in Example 1, except for using carrier D.

The catalytic activity of catalyst D was evaluated in the same manner as in Example 1. The results obtained are shown in Table 2. It is seen that catalyst D containing neither zinc oxide nor boric acid is considerably inferior to catalyst A in both cracking and desulfurization activities.

EXAMPLE 2

(a) Carrier E was prepared in the same manner as in Example 1, except for using no boric acid. Carrier E contained 65% of alumina, 30% of USY zeolite and 5% of ZnO, each based on the total weight of carrier E.

(b) Catalyst E having supported thereon 8% of molybdenum and 3% of nickel, each based on the total weight of catalyst E, was prepared in the same manner as for catalyst A in Example 1, except for using carrier E.

The catalytic activity of catalyst E was evaluated in the same manner as in Example 1. The results obtained are shown in Table 2. It is seen that catalyst E containing no boric acid is slightly less active than catalyst A in cracking and desulfurization.

EXAMPLE 3

(a) A carrier was prepared in the same manner as in Example 1, except for using no zinc oxide. The carrier contained 63.2% of alumina, 30% of USY zeolite and 6.8% of $B_2O_3$, each based on the total weight of the carrier.

(b) The carrier prepared in (a) above was dipped in a zinc nitrate aqueous solution, dried at 130° C. overnight, and calcined at 600° C. for 1 hour to prepare carrier F. Carrier F contained 58.2% of alumina, 30% of USY zeolite, 5% of ZnO, and 6.8% of $B_2O_3$, each based on the total weight of carrier F. Cross section analysis of carrier F with an X-ray microanalyzer revealed that ZnO was distributed throughout the carrier extremely uniformly, with no particles of 0.1 μm or greater observed. On examining the X-ray diffraction pattern of carrier F, no diffraction peak assigned to Zn was observed.

(b) Catalyst F having supported thereon 8% of molybdenum and 3% of nickel, each based on the total weight of catalyst F, was prepared in the same manner as for catalyst A in Example 1, except for using carrier F.

The catalytic activity of catalyst F was evaluated in the same manner as in Example 1. The results obtained are shown in Table 2. It is seen that catalyst F which does not contain particulate zinc oxide of 0.1 μm or greater is slightly inferior to catalyst A in desulfurization activity.

EXAMPLE 4

(a) Carrier G containing 75% of alumina, 15% of zeolite, 2% of ZnO, and 8% of $B_2O_3$, each based on the total weight of carrier G, was prepared in the same manner as in Example 1-(c), except for altering the charging ratio of zeolite, zinc oxide, and boric acid.

(b) Catalyst G having supported thereon 12% of molybdenum and 3% of nickel, each based on the total weight of catalyst G, was prepared in the same manner as for catalyst A in Example 1, except for using carrier G.

The catalytic activity of catalyst G was evaluated in the same manner as in Example 1. The results obtained are shown in Table 2. As compared with catalyst A, catalyst G exhibits slightly reduced cracking activity but improved desulfurization activity because of the reduced zeolite content in the carrier.

EXAMPLE 5

(a) The same USY zeolite as prepared in Example 1-(b) was treated with a 0.2 mol/l aqueous solution of zinc chloride of an amount 10 times the zeolite, filtered, washed, dried at 130° C., and calcined at 450° C. to obtain zinc-containing zeolite, ZnUSY zeolite. ZnUSY zeolite had a zinc content of 0.85% in terms of metallic zinc.

(b) Carrier H was prepared in the same manner as in Example 4, except for using ZnUSY zeolite in place of USY zeolite. Carrier H contained 75% of alumina, 15% of ZnUSY zeolite, 2% of ZnO, and 8% of $B_2O_3$, each based on the total weight of carrier H.

(c) Catalyst H having supported thereon 12% of molybdenum and 3% of nickel, each based on the total weight of catalyst H, was prepared in the same manner as for catalyst A in Example 1, except for using carrier H.

The catalytic activity of catalyst H was evaluated in the same manner as in Example 1. The results obtained are shown in Table 2. Catalyst H exhibits further improved cracking and desulfurization activities because of the use of ZnUSY zeolite in place of USY zeolite.

EXAMPLE 6

(a) Carrier I was prepared in the same manner as in Example 5, except for using magnesium oxide powder in addition to ZnUSY zeolite, zinc oxide, and boric acid in Example 5-(b). Carrier I contained 74.7% of alumina, 15% of ZnUSY zeolite, 2% of ZnO, 8% of $B_2O_3$, and 0.3% of MgO, each based on the total weight of carrier I.

(b) Catalyst I having supported thereon 12% of molybdenum and 3% of nickel, each based on the total weight of catalyst I, was prepared in the same manner as for catalyst A in Example 1, except for using carrier I.

The catalytic activity of catalyst I was evaluated in the same manner as in Example 1. The results obtained are shown in Table 2. Catalyst I exhibits further improved cracking and desulfurization activities because of the incorporation of trace of MgO as a carrier component.

for a prolonged period of time simply by exchanging catalysts with no need of special remodeling of the conventional reaction apparatus.

Since the catalyst of the present invention makes it possible to carry out high cracking rate processing at a reaction temperature lower than that conventionally adopted, it suppresses various unfavorable phenomena accompanying high temperature reaction, such as an increase of pressure drop due to coking and a reduction in selectivity to the heart cut due to overcracking of feedstock oil. The reduced temperature also serves to suppress catalyst deactivation, remarkably extending the catalyst life. In particular, even under such a hydrogen pressure as low as not higher than 40 $kg/cm^2$, deactivation due to coking can be reduced, and high cracking activity and high desulfurization activity can be maintained.

While the invention has been described in detail and with reference to specific examples thereof, it will be apparent to one skilled in the art that various changes and modifications can be made therein without departing from the spirit and scope thereof.

What is claimed is:

1. A catalyst for hydroprocessing comprising a carrier having supported thereon a group VI metal and/or a group VIII metal of the periodic table, in which said carrier comprises (a) an inorganic refractory substance selected from the group consisting of alumina alone and alumina containing at least one of silica, magnesia, and calcium oxide;

TABLE 2

| Example No. | Catalyst | Carrier Composition | Desulfurization Activity $K_s$ | Denitrification Activity $K_N$ | Cracking Rate C (%) |
|---|---|---|---|---|---|
| 1 | A | 58.2% $Al_2O_3$ + 30% USY + 5% ZnO + 6.8% $B_2O_3$ | 19.2 | 2.03 | 28.6 |
| 2 | E | 65% $Al_2O_3$ + 30% USY + 5% ZnO | 17.3 | 1.37 | 23.7 |
| 3 | F | 58.2% $Al_2O_3$ + 30% USY + 5% infiltrated ZnO + 6.8% $B_2O_3$ | 13.9 | 1.62 | 27.3 |
| 4 | G | 75% $Al_2O_3$ + 15% USY + 2% ZnO + 8% $B_2O_3$ | 23.4 | 1.99 | 23.9 |
| 5 | H | 75% $Al_2O_3$ + 15% ZnUSY + 2% ZnO + 8% $B_2O_3$ | 27.1 | 1.96 | 24.5 |
| 6 | I | composition of carrier H + 0.3% MgO | 32.0 | 1.92 | 27.1 |
| Compara. 1 | B | 58.2% $Al_2O_3$ + 30% HY + 5% ZnO + 6.8% $B_2O_3$ | 14.8 | 1.39 | 22.6 |
| Compara. 2 | C | 58.2% $Al_2O_3$ + 30% modified Y + 5% ZnO + 6.8% $B_2O_3$ | 13.8 | 1.32 | 11.4 |
| Compara. 3 | D | 70% $Al_2O_3$ + 30% USY | 15.6 | 1.56 | 19.5 |

As described and demonstrated above, the catalyst for hydroprocessing according to the present invention exhibits not only high cracking activity and high desulfurization activity but an extended catalyst life. Therefore, the catalyst of the present invention achieves increased rates of cracking and desulfurization in carrying out hydroprocessing of heavy oil having a high content of high-boiling components (b) Y zeolite having a unit lattice constant of 2.425 to 2.445 nm, and (c) zinc oxide having a particle size of 0.1 µm or greater.

2. A catalyst for hydroprocessing according to claim 1, wherein said carrier further contains a boron compound.

3. A catalyst for hydroprocessing according to claim 1, wherein said Y zeolite contains at least one element selected from the group consisting of zinc, cobalt, nickel, iron, copper, titanium, niobium, molybdenum, and zirconium.

4. A catalyst for hydroprocessing according to claim 1, wherein said carrier contains 1 to 50% by weight of Y zeolite and 0.1 to 10% by weight, in terms of ZnO, of zinc oxide, each based on the total weight of the carrier, the balance being an inorganic refractory substance.

5. A catalyst for hydroprocessing according to claim 2, wherein said carrier contains 1 to 50% by weight of Y zeolite, 0.1 to 10% by weight, in terms of ZnO, of zinc oxide, and 0.1 to 16% by weight, in terms of $B_2O_3$, of a boron compound, each based on the total weight of the carrier, the balance being an inorganic refractory substance.

6. A catalyst for hydroprocessing according to claim 4, wherein said carrier contains 5 to 30% by weight of Y zeolite and 1 to 5% by weight, in terms of ZnO, of zinc oxide, each based on the total weight of the carrier, the balance being an inorganic refractory substance.

7. A catalyst for hydroprocessing according to claim 5, wherein said carrier contains 5 to 30% by weight of Y zeolite, 1 to 5% by weight, in terms of ZnO, of zinc oxide, and 5 to 12% by weight, in terms of $B_2O_3$, of a boron compound, each based on the total weight of the carrier, the balance being an inorganic refractory substance.

8. A catalyst for hydroprocessing according to claim 1, wherein said zinc oxide in the carrier has a particle size of from 0.1 to 100 μm.

9. A catalyst for hydroprocessing according to claim 2, wherein said boron compound is used in such an amount that a $B_2O_3/(B_2O_3+Al_2O_3)$ ratio in the carrier ranges from 0.06 to 0.20.

10. A catalyst for hydroprocessing according to claim 9, wherein said boron compound is used in such an amount that a $B_2O_3/(B_2O_3+Al_2O_3)$ ratio in the carrier ranges from 0.08 to 0.16.

11. A catalyst for hydroprocessing according to claim 1, wherein said inorganic refractory substance comprises 0 to 10% by weight, in terms of $SiO_2$, of silica, 0 to 5% by weight, in terms of MgO, of magnesia, and 0 to 5% by weight, in terms of CaO, of calcium oxide, each based on the total weight of the inorganic refractory substance, the balance being alumina.

12. A catalyst for hydroprocessing according to claim 11, wherein said inorganic refractory substance comprises 1 to 5% by weight, in terms of $SiO_2$, of silica, 0.1 to 1% by weight, in terms of MgO, of magnesia, and 0.1 to 1% by weight, in terms of CaO, of calcium oxide, each based on the total weight of the inorganic refractory substance, the balance being alumina.

13. A catalyst for hydroprocessing according to claim 1, wherein said zinc oxide in the carrier has a particle size of from 5 to 30 μm.

* * * * *